(12) United States Patent
Hawks et al.

(10) Patent No.: US 6,403,922 B1
(45) Date of Patent: Jun. 11, 2002

(54) DEVICE FOR HEATING AN ENCLOSED SPACE FOR ANIMALS

(75) Inventors: Randall D. Hawks, 2300 Carlford Rd., Pleasant Garden, NC (US) 27313; Gary L. Kolbet, 2503 White Fence Way, High Point, NC (US) 27265

(73) Assignees: Gary L. Kolbet, High Point; Randall D. Hawks, Pleasant Garden, both of NC (US)

(*) Notice: Subject to any disclaimer, the term of this patent is extended or adjusted under 35 U.S.C. 154(b) by 0 days.

(21) Appl. No.: 09/802,333

(22) Filed: Mar. 8, 2001

(51) Int. Cl.$^7$ .............................. A01K 1/00; H05B 3/06
(52) U.S. Cl. ...................... 219/385; 219/213; 219/400; 219/399; 119/448
(58) Field of Search .................... 219/385, 213, 219/399, 400, 523, 530, 534, 540; 392/347, 370, 375, 376; 119/308, 309, 448, 578

(56) References Cited

U.S. PATENT DOCUMENTS

| | | | | |
|---|---|---|---|---|
| 1,713,013 A | * | 5/1929 | Wadnless | 219/540 |
| RE17,857 E | * | 11/1930 | Burgher | 219/530 |
| 1,840,261 A | * | 1/1932 | Sideman | 219/520 |
| 2,252,191 A | | 8/1941 | Marks | 119/15 |
| 2,333,915 A | | 11/1943 | Budd | 135/1 |
| 2,689,906 A | | 9/1954 | Corbett | 219/39 |
| 3,051,816 A | * | 8/1962 | Knoll et al. | 219/213 |
| 3,068,341 A | | 12/1962 | Ortiz et al. | 219/39 |
| 3,160,139 A | | 12/1964 | Wales, Jr. | 119/1 |
| 4,124,794 A | * | 11/1978 | Eder | 219/530 |
| 4,249,065 A | * | 2/1981 | Malone | 119/309 |
| 4,298,788 A | | 11/1981 | Jones et al. | 219/386 |
| 4,307,284 A | * | 12/1981 | Perron | 392/376 |
| 4,558,209 A | * | 12/1985 | Hess | 219/530 |
| 4,600,857 A | * | 7/1986 | Suhar | 219/540 |
| 5,003,923 A | * | 4/1991 | Morgan | 219/385 |
| 5,272,316 A | * | 12/1993 | Chesnut | 219/385 |
| 5,511,145 A | | 4/1996 | Bailey et al. | 392/355 |
| 5,746,271 A | | 5/1998 | DeCosta | 165/53 |
| 5,809,936 A | | 9/1998 | Wall | 119/484 |
| 5,922,227 A | | 7/1999 | McMurtrie | 219/220 |
| 6,072,938 A | * | 6/2000 | Peterson et al. | 392/343 |
| 6,134,386 A | * | 10/2000 | O'Donnell | 392/432 |
| 6,205,290 B1 | * | 3/2001 | Hung et al. | 392/347 |

FOREIGN PATENT DOCUMENTS

SU          829067          5/1981

OTHER PUBLICATIONS

Copy of Lectro Pad Product Page from Internet, date unknown but believed to be prior art, 2 pages.
Copy of Heat Exchange Applied Technology, Inc. Product Page from Internet, date unknown but believed to be prior art, 3 pages.
Copy of Advertisement for Tempco Electric Heater Corporation, date unknown but believed to be prior art, 1 page.

* cited by examiner

Primary Examiner—Joseph Pelham
(74) Attorney, Agent, or Firm—Womble Carlyle Sandridge & Rice, PLLC

(57) ABSTRACT

A device for heating an enclosed space of the type used for housing small animals, including at least one heating element, at least one connector for electrically connecting the heating element with an electrical power supply, and a protective cover formed of highly thermally conductive material, such that the protective cover is shaped to transfer heat to the enclosed space without attaining a surface temperature harmful on contact to animals

26 Claims, 3 Drawing Sheets

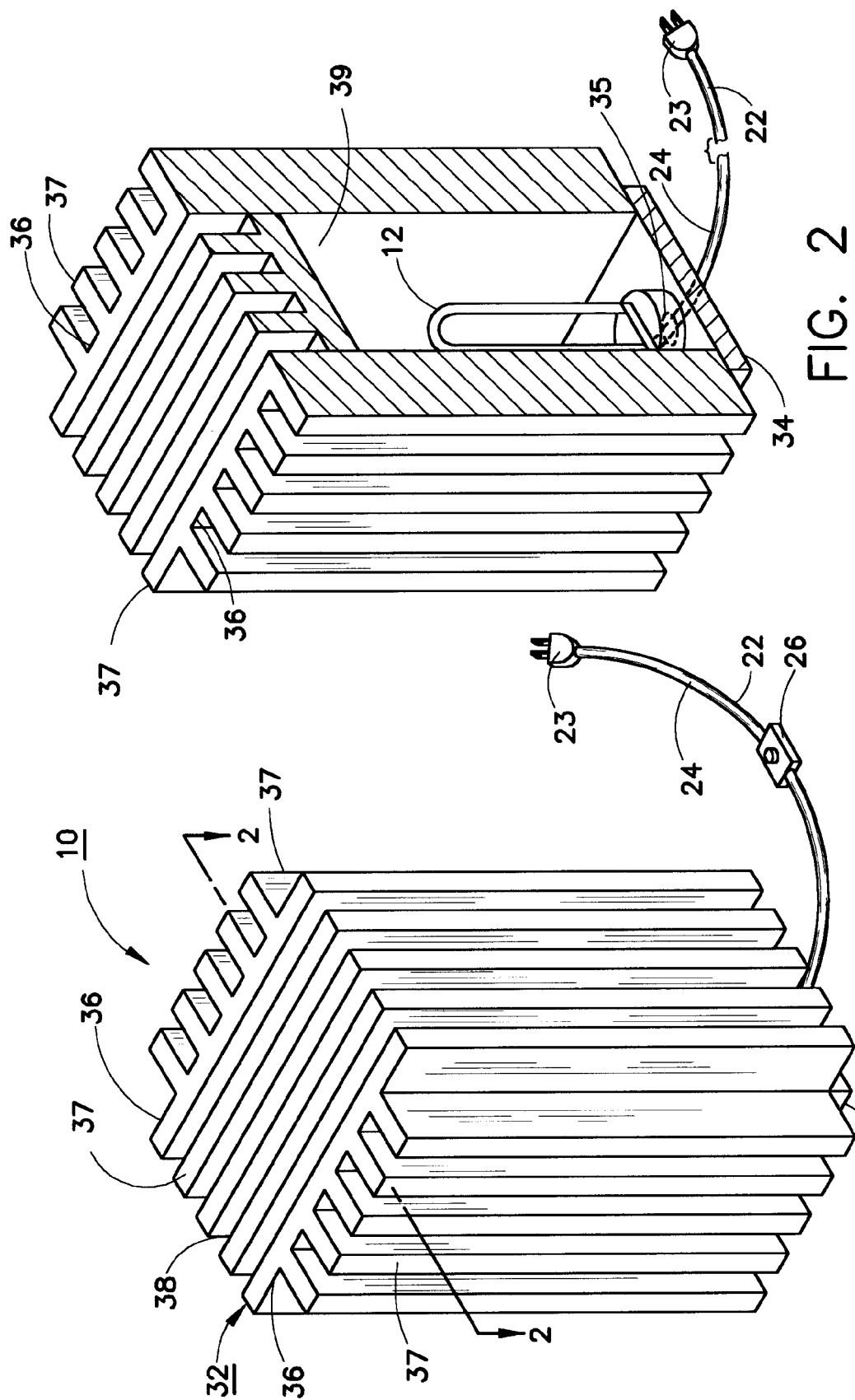

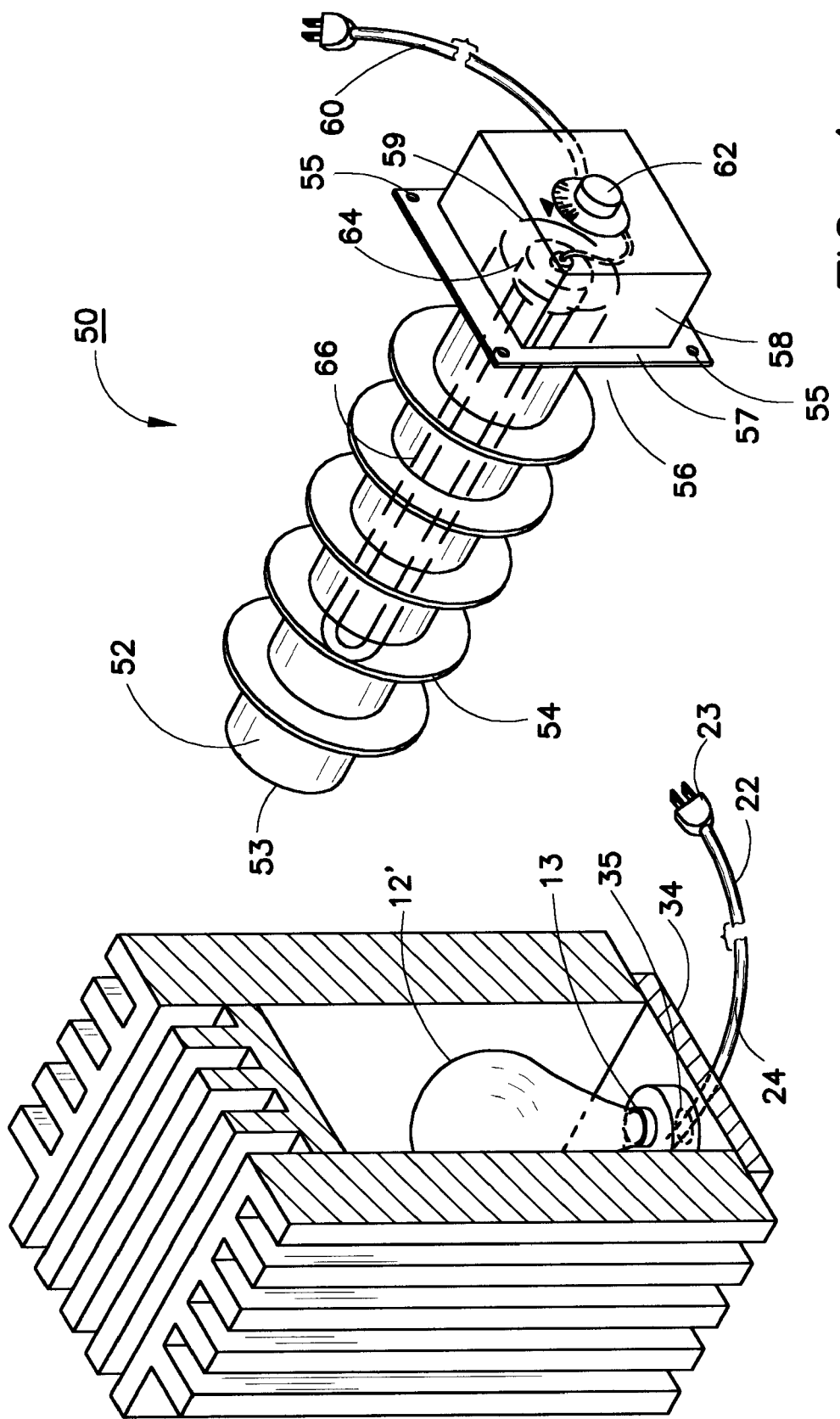

DEVICE FOR HEATING AN ENCLOSED SPACE FOR ANIMALS

FIELD OF THE INVENTION

The present invention relates to the field of animal care, and, more particularly, to devices for sheltering and protecting small animals from exposure to the outdoor elements.

BACKGROUND OF THE INVENTION

Recent years have seen a proliferation of different sizes and shapes of doghouses, shelters, kennels, and cages. Most have been designed and marketed for small animals that spend most, of not all, of their lives outside. However, when weather conditions result in extremely cold temperatures, these houses and shelters offer little protection. This means that owners are often required to make other arrangements for their small animals such as brining them indoors and placing them in uncomfortably small crates. This is not only troublesome for the owners, but also disruptive to the normal habits of the animal, entailing distressful and unhealthy conditions for the animals. When cold conditions persist for a long period, the quality of life of both animal and owner is severely diminished.

Heating devices have been developed for keeping small animals warm, but these have focused on indoor pets. For example, there are known in the art birdcage heaters, small animal incubators, and indoor basking beds. There are heating pads for animals to lay on, but these are also intended principally for indoor use and would provide minimal protection if used outdoors. One invention specifically intended for outdoor use is a climate-controlled doghouse with an installed heating and air conditioning unit. However, that construction is complex, expensive, and the heating and air conditioning unit cannot be used separable from the doghouse.

SUMMARY OF THE INVENTION

The present invention is directed to a simple, safe heating device that addresses the problems described above. The heating device of the present invention is compact and easily installed or removed, simple and inexpensive, and durably formed for outside use.

One aspect of the present invention is to provide a device for heating an enclosed space of the type used for sheltering small animals, in which a heating element is in electrical communication with an external electrical power supply, and for which a protective cover is provided. The protective cover includes fins which allow heat to be transferred to the enclosed space of the animal shelter without attaining an outer surface temperature that is harmful to the touch should the animal come in contact with it.

At least one heating element is housed within the protective cover. The heating element is desirably a resistance coil, but may also be an incandescent bulb or other resistive element known in the art that may be suitably configured and disposed within the protective cover. A heating element related between about 40 and 100 watts, with about 60 watts being desirable, provides an effective head load to transfer heat through the protective cover to an average enclosed space of about 20 to 25 cubic feet having about one-half inch of polystyrene insulation on the outer walls, without creating a protective cover temperature that is hurtful to the touch. As those knowledgeable of heat transfer will appreciate, the output of the heating element may be varied as the surface area and thickness of the protective cover, and the insulation of the enclosed space, are varied. Consequently, the enclosed space for the animal may be enlarged. Heating elements of differing ratings may be combined with regulating devices to achieve a desired thermal output.

A socket and connector are provided for electrically joining the heating element to an external electrical power source such as a standard 110-volt outlet. The connector may be a conventional power cord. Desirably, since the heating device of the present invention is intended for outdoor use, the connector is moisture-proof. To protect the animal from electric shock, the connector may include a protective outer casing to prevent an animal from gnawing or chewing into the connector. The connector may further include a thermostatic controller that is either attached to the protective cover or placed in electrical communication with the external power supply.

In one embodiment of the present invention, the protective cover is box shaped and is formed of a highly thermally conductive material such as aluminum, alloys of aluminum, stainless steel, or iron. Other suitable thermally conductive metallic and non-metallic materials known in the art may be used for forming the protective cover. The base of the protective cover is preferably removable to facilitate access within the protective cover for the changing of heating elements, but may be welded or otherwise sealed.

In a second embodiment, the protective cover is generally cylindrical with fins spaced along the length. In all other respects, other than shape, this embodiment is functionally similar to the first embodiment.

As described hereinabove, the heating element of the present invention is so rated and the protective cover so shaped to provide sufficient heat transfer to an enclosed space without creating a surface temperature on the protective housing that is harmful to the touch. As such, the construction described herein limits the outer surface temperature of the heating device to a temperature less than about 200 degrees Fahrenheit, and desirably no greater than about 180 degrees Fahrenheit.

These and other aspects of the present invention will become apparent to those skilled in the art after a reading of the following description of the preferred embodiments, when considered in conjunction with the drawings. It should be understood that both the foregoing general description and the following detailed description are exemplary and explanatory only and are not restrictive of the invention as claimed.

BRIEF DESCRIPTION OF THE DRAWINGS

FIG. 1 is a perspective view of the heating device of the present invention having a protective cover with conductive fins;

FIG. 2 is a perspective view of the device of FIG. 1 with one side broken away along Line 2—2 illustrating a resistance coil heating element disposed within the protective cover;

FIG. 3 is a perspective view of the device of FIG. 1 with one side broken away and illustrating an incandescent bulb heating element disposed within the protective cover;

FIG. 4 is a perspective view of an alternative embodiment of the present invention having a cylindrical protective cover with conductive fins extending radially outward therefrom.

DETAILED DESCRIPTION OF THE PREFERRED EMBODIMENTS

Figure 5:
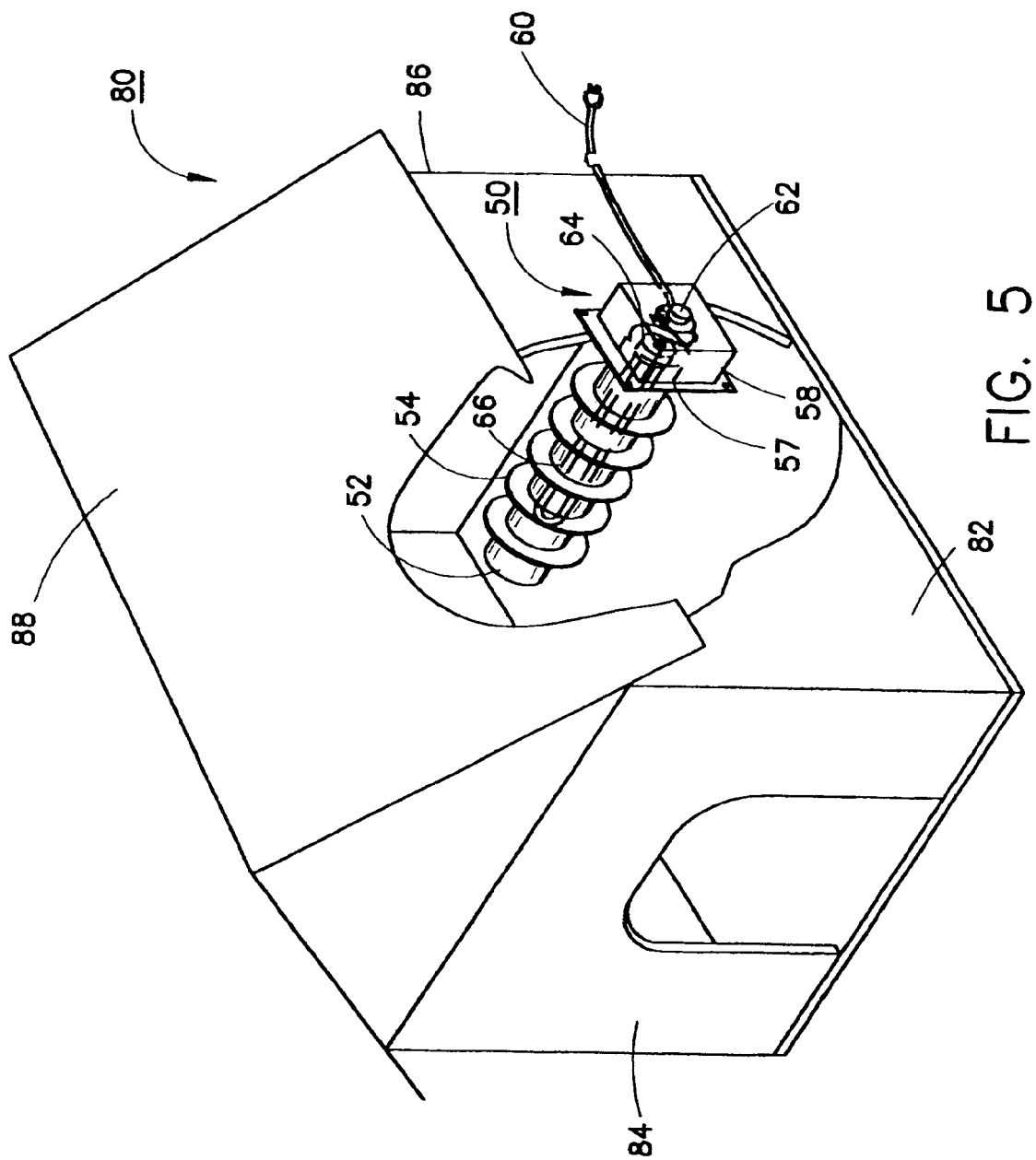
FIG. 5 is an environmental view of the alternative embodiment of FIG. 4 mounted in an animal enclosure.

As shown in FIGS. 1 and 2, the present invention is directed to a device for heating an enclosed space, such as a doghouse, used to shelter small animals. Shown generally as 10, the heating device includes at least one heating element 12, a connector cable 22 for electrically communicating the heating element 12 with an electrical power supply (not shown), and a protective cover 32.

As best seen in FIGS. 1 and 2, a heating element 12 is secured within and completely enclosed by protective cover 32 and base 34. The device 10 of the present invention does not require either active or passive ventilation of heating element 12. The heating element 12 shown in FIG. 2 is illustrative of a resistance coil commonly known in the art and commercially available. It has been found that a heating element rated between about 40 and 100 watts provides the desired heat load for the present invention, with 50 to 60 watts being optimal. One such resistance coil is a 50 watt element available from Tempco Electric Heater Corporation of Wood Dale, Ill. as Item Number LDC00017. Alternatively, as shown in FIG. 3, heating element 12' may be a conventional incandescent light bulb rated at between about 40 watts and 100 watts. The manner in which heating elements 12, 12' are secured within the protective cover 32 is dependent upon the type and size of the element chosen, as discussed further herein below.

An electrical connector 22 is provided to electrically communicate heating element 12, 12' with an external electrical power supply (not shown). The electrical connector in its simplest form is a grounded power cord such as conventional 12 gauge, 3-conductor covered wiring for exterior use. Such electrical wiring is well known in the art and rated for 110-volt use. Connector cable 22 is disposed through an aperture 35 formed through base 34 and electrically attached using wire nuts, spring retainers, or screws, as dictated by the type and model of heating element. Such fastening means are conventional and well known in the art. Where heating element 12' is an incandescent bulb, a socket 13 is first electrically attached to cable 22. A standard bulb 12' is then screwed into the socket in a conventional manner.

A standard 3-prong plug 23 is attached to the outer end of cable 22 for plugging into a conventional household 110-volt grounded (such as a ground fault interruptible circuit) outlet. To protect chewing or gnawing animals from electrical shock, the connector includes a protective outer casing or sheath 24 such as a flexible metallic conduit, well known in the art.

While not required for satisfactory performance of the heating device, a thermostatic controller 26 is electrically connected between heating element 12, 12' and plug 23, and appropriately positioned in the enclosed space. As shown in FIG. 1, thermostatic controller 26 is connected in-line to electrical connector 22. Thermostatic controller 26 allows the animal owner to variably regulate the thermal output of the heating element 12, 12' depending upon the ambient temperature in the animals's enclosed space, as well as the size of the enclosed space. One such suitable thermostatic controller 26 is Model TST-101-109 available from Tempco Electric Heater Corporation. The thermostatic controller may be housed in a separate enclosure or within the protective cover 32. Alternatively, other devices such as potentiometers may be used to achieve the same result by regulating the output of the heating element.

To protect an animal from direct contact with heating element 12, 12', and to uniformly and effectively transfer heat from heating element 12, 12', a protective cover 32 is provided to completely enclose heating elements 12, 12'. In one embodiment, protective cover 32 includes a plurality of side walls 36 and a top 38 removably attached to base 34. In the preferred embodiment, protective cover 32 is formed as a one-piece die-cat housing with an open bottom. Protective cover 32 is formed from aluminum, but other highly thermally conductive materials, including, but not limited to, aluminum alloys, stainless steel, and iron may well be substituted. The protective cover for heating elements 12, 12' described hereinabove is approximately 6 inches tall, 5 inches wide and 5 inches deep. The inner cavity 39 of protective cover 32 is approximately 5 inches tall, 3 inches wide, and 3 inches deep. The walls 36 and top 38 are approximately ⅓ thick. Base 34 is approximately ¼ inch thick. It will be appreciated by those skilled in the art that the dimensions may be varied in proportion to the size and rating of heating element 12, 12' chosen. It is only important that the cover not exceed the prescribed temperature of about 200 degrees Fahrenheit and that it effectively dissipate the heat from the element.

As shown in FIG. 4, a second embodiment of the heating device 50 includes a generally cylindrical protective cover 52 with a closed end 53 and a base 56. Protective cover 52 is also formed from aluminum or other highly thermally conductive material. As in the previous embodiment, the cylindrical cover 52 and closed end 53 are approximately ⅓ inch thick. Base 56 is formed with a flanged plate 57 that matingly engages protective cover 52 through an opening 59 in plate 57. A socket 64 is supported by the base 56 so that a heating element 66 may be supported therein. Heating element 66 is of the same type described hereinabove. Socket 64 and heating element 66 extend into the protective cover 52. The protective cover 52 and plate 57 are preferably secured together by welding or adhesive bonding, but mechanical fasteners known in the art may also be used. Plate 57 includes slots or grooves 55 to permit heating device 50 to be mounted through an opening formed through the pet enclosure and secured with conventional fasteners. FIG. 5 best illustrates how the heating device 50 may be mounted in the wall of an animal enclosure 80, such as a doghouse. An electrical box 58 fastens to an opposite side of plate 57 for enclosing the heating element and electrical connections. Box 58 is fastened to plate 57 with screws, clips, or other conventional fasteners. A thermostatic controller 62 may be installed within the box 58 to function as described hereinabove. An electrical cable 60 or other suitable connector interconnects the heating element (not shown) as described hereinabove with an electrical power supply.

Referring again to FIGS. 1 and 2, the outer surfaces of protective cover 32 are shaped to maximize the heat transfer area and uniformly transfer heat to the enclosed space. In the aluminum die-cast embodiment, protective cover 32 includes integrally formed thermally conductive ribs, or fins, 37 extending outward from the side walls 36 and upwardly from the top 38. It has been discovered that fins projecting approximately 1 inch outwardly and upwardly provide sufficient heat-transfer surface area for cover 32. The fins 37 are approximately ⅛ inch wide and spaced ⅓ inch apart. Again, the relative dimensions may be varied in relationship to the size and rating of heating element 12, 12' chosen. The base 34 is substantially flat, permitting the heating device 10 to be oriented upright, if desired. Protective cover 32 is connected to base 34 with screws, but other suitable fastening means may be used including clips or bands. Alternatively, base 34 may be frictionally engaged by side walls 36 to hold it in place.

Referring again to FIG. 4, the protective cover of the second embodiment includes a series of fins or ribs 54 attached to and extending radially outwardly from protective cover 52. The ribs are approximately ⅛ inch thick and extend outward about ¾ inches from protective cover 52. The ribs are also spaced apart from one another by approximately ⅓ inch. It will be appreciated that the ribs 54 shown in FIG. 4 are reduced in number so as to be merely illustrative of the plurality of ribs that are attached to protective cover 52. While there are various ways in which protective cover 52 with fins or ribs 54 may be produced, one suitable source that can fabricate a protective cover with fins as described hereinabove is Heat Exchange Applied Technology of Orrville, Ohio. As those skilled in the art will readily appreciate, the shape and relative dimensions of the apparatus may be varied so long as the relative thicknesses of the apparatus (cover and fins or ribs) and the outer heat transfer surface area are approximately equal.

As stated hereinabove, protective cover 32, 52 is so formed that it transfers heat to an enclosed space, such as doghouse, without attaining a temperature that is harmful on contact to the animals. When constructed as described herein, the surface temperature of protective cover 32 is between about 180 to 200 degrees Fahrenheit, and desirably no greater than about 180 degrees Fahrenheit, wherein the upper limit will not result in any harm to an animal, or human, on contact.

Turning to FIG. 5, there is shown an animal shelter 80 having a heating device 50 mounted therein. The shelter 80 has a plurality of walls including sidewalls 82, front wall 84, rear wall 86, and roof 88. Shelter 80 may take on many forms other than the conventional embodiment. Heating device 50 is mounted through a side wall 82 such that the plate 57 is mounted to the exterior surface of wall 82. The socket 64 and heating element 66 extend into the protective cover 52, and hence, into the inner volume of the shelter 80. The electrical box 58 with thermostatic controller 62 is also located on the exterior. Alternatively, heating device 50 may be installed through the outer wall surfaces of the shelter 80. Connector 60 connects the heating element with an electrical power supply.

Although the present invention has been described with a preferred embodiment, it is to be understood that modifications and variations may be utilized without departing from the spirit and scope of the invention, as those skilled in the art will readily understand. Such modifications and variations are considered to be within the purview and scope of the appended claims and their equivalents.

We claim:

1. A device for heating an enclosed space of the type used for sheltering small animals, comprising:
    (a) a socket capable of receiving at least one heating element;
    (b) at least one connector for electrically connecting said socket with an electrical power supply;
    (c) a protective cover for said at least one heating element, said protective cover comprising a removable base, a plurality of side walls, and a top; and
    (d) thermally conductive ribs integrally formed with and extending outwardly from said plurality of side walls of said protective cover, wherein said protective cover is so configured to protect the animal from direct contact with said heating element and to transfer heat to said enclosed space without attaining a surface temperature harmful on contact to said animals.

2. A heating device of claim 1 further including at least one heating element mounted in said socket.

3. The heating device of claim 2 wherein said at least one heating element is rated between about 40 and 100 watts.

4. The heating device of claim 1 wherein said at least one connector further includes a protective outer casing.

5. The heating device of claim 1 wherein said at least one connector further includes a thermostatic controller, said thermostatic controller disposed in electrical communications with said at least one connector.

6. The heating device of claim 1 wherein said protective cover is formed of highly thermally conductive material selected from the group consisting of aluminum, aluminum alloys, iron, and stainless steel.

7. The heating device of claim 1 further including thermally conductive ribs integrally formed with and extending outwardly from said top of said protective cover.

8. The heating device of claim 1 or 7 wherein said thermally conductive ribs are about ⅛ inch wide and spaced apart from one another about ⅓ inch, said thermally conductive ribs extending about one inch outwardly from said protective cover.

9. The heating device of claim 1 wherein the surface temperature attained by said protective cover is less than about 200 degrees Fahrenheit.

10. A device for heating an enclosed space of the type used for sheltering small animals, comprising:
    (a) a socket capable of receiving at least one heating element;
    (b) at least one connector for electrically connecting said socket with an electrical power supply;
    (c) a protective cover for said at least one heating element, wherein said protective cover is cylindrically shaped, and so configured to protect the animal from direct contact with said heating element and to transfer heat to said enclosed space without attaining a surface temperature harmful on contact to said animals.

11. The heating device of claim 10 further including a plurality of thermally conductive ribs extending outwardly from the outer surface of said protective cover.

12. The heating device of claim 11 wherein said thermally conductive ribs are about ⅛ inch wide and spaced apart from one another about ⅓ inch, said thermally conductive ribs extending about one inch outwardly from said protective cover.

13. An animal shelter having an enclosed space comprising:
    (a) a plurality of walls and a roof;
    (b) a socket capable of receiving at least one heating element, said socket attached to one of said walls for receiving a heating element within said enclosed space;
    (c) at least one connector for electrically connecting said socket with an electrical power supply; and
    (d) a protective cover for said at least one heating element, said protective cover so configured to protect the animal from direct contact with said heating element and to transfer heat to said enclosed space without attaining a surface temperature harmful on contact to said animals.

14. The heating device of claim 13 further including at least one heating element mounted in said socket.

15. The heating device of claim 14 wherein said at least one heating element is rated between about 40 and 100 watts.

16. The heating device of claim 13 wherein said at least one connector further includes a protective outer casing.

17. The heating device of claim 13 wherein said at least one connector further includes a thermostatic controller, said thermostatic controller disposed in electrical communication with said at least one connector.

18. The heating device of claim 13 wherein said protective cover is formed of highly thermally conductive material selected from the group consisting of aluminum, aluminum alloys, iron, and stainless steel.

19. The device of claim 13 wherein said protective cover includes:

(a) a removable base; and (b) a plurality of side walls and a top.

20. The device of claim 13 wherein said protective cover is cylindrically shaped.

21. The heating device of claim 19 further including thermally conductive ribs integrally formed with and extending outwardly from said plurality of side walls of said protective cover.

22. The heating device of claim 19 further including thermally conductive ribs integrally formed with and extending outwardly from said top of said protective cover.

23. The heating device of claim 21 or 22 wherein said thermally conductive ribs are about $\frac{1}{8}$ inch wide and spaced apart from one another about $\frac{1}{3}$ inch, said thermally conductive ribs extending about one inch outwardly from said protective cover.

24. The heating device of claim 20 further including a plurality of thermally conductive ribs extending outwardly from the outer surface of said protective cover.

25. The heating device of claim 24 wherein said thermally conductive ribs are about $\frac{1}{8}$ inch wide and spaced apart from one another about $\frac{1}{3}$ inch, said thermally conductive ribs extending about one inch outwardly from said protective cover.

26. The heating device of claim 13 wherein the surface temperature attained by said protective cover is less than about 200 degrees Fahrenheit.

* * * * *